United States Patent
Murai et al.

(10) Patent No.: US 9,782,939 B2
(45) Date of Patent: Oct. 10, 2017

(54) METHOD AND MOLD FOR MANUFACTURING FIBER-REINFORCED PLASTIC STRUCTURE

(71) Applicant: MITSUBISHI AIRCRAFT CORPORATION, Aichi (JP)

(72) Inventors: Tomohiro Murai, Tokyo (JP); Wataru Naganawa, Tokyo (JP); Hiroshi Tokutomi, Tokyo (JP); Masaaki Nishiguchi, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 523 days.

(21) Appl. No.: 14/293,166

(22) Filed: Jun. 2, 2014

(65) Prior Publication Data

US 2014/0361455 A1 Dec. 11, 2014

(30) Foreign Application Priority Data

Jun. 7, 2013 (JP) ................................. 2013-120943

(51) Int. Cl.
  *B29C 70/54* (2006.01)
  *B29C 70/46* (2006.01)
  *B29D 99/00* (2010.01)

(52) U.S. Cl.
  CPC ............ *B29C 70/543* (2013.01); *B29C 70/46* (2013.01); *B29D 99/0014* (2013.01)

(58) Field of Classification Search
  CPC ........ B29C 70/54; B29C 70/46; B29C 70/543
  USPC ................ 269/50, 292, 295, 290, 54.4, 54.5
  See application file for complete search history.

(56) References Cited

U.S. PATENT DOCUMENTS

| | | | | |
|---|---|---|---|---|
| 3,188,715 A | * | 6/1965 | Michalsen | B23Q 3/102 269/319 |
| 3,544,530 A | * | 12/1970 | Shaffer | C08G 65/36 526/270 |
| 3,554,530 A | * | 1/1971 | Moore | B23Q 16/001 269/301 |
| 2008/0302912 A1 | * | 12/2008 | Yip | B29C 43/10 244/119 |

OTHER PUBLICATIONS

"Research in the Application of the VaRTM Technique to the Fabrication of Primary Aircraft Composite Structures," Mitsubishi Heavy Industries, Ltd., Technical Review vol. 42 No. 5 (Dec. 2005).

\* cited by examiner

*Primary Examiner* — Matthew Daniels
(74) *Attorney, Agent, or Firm* — Pearne & Gordon LLP

(57) ABSTRACT

In the manufacturing method of the present invention, as preparation for providing a mold 30 with protrusions 31 and 32 to be printed on an FRP material of a skin 1 in co-bold molding, which requires resetting of the skin 1 to the mold 30, a long protrusion 32A and a short protrusion 32B are interchangeable as one protrusion 32. The long protrusion 32A is printed to form a second recessed part 12 in the skin 1, and before the skin 1 is reset, the long protrusion 32A is replaced with the short protrusion 32B. In this way, as the short protrusion 32B is housed in the second recessed part 12 formed during elongation of the mold 30, the skin 1 can be reset in the state of being positioned relative to the mold 30 by the first protrusion 31 and the short protrusion 32B.

20 Claims, 9 Drawing Sheets

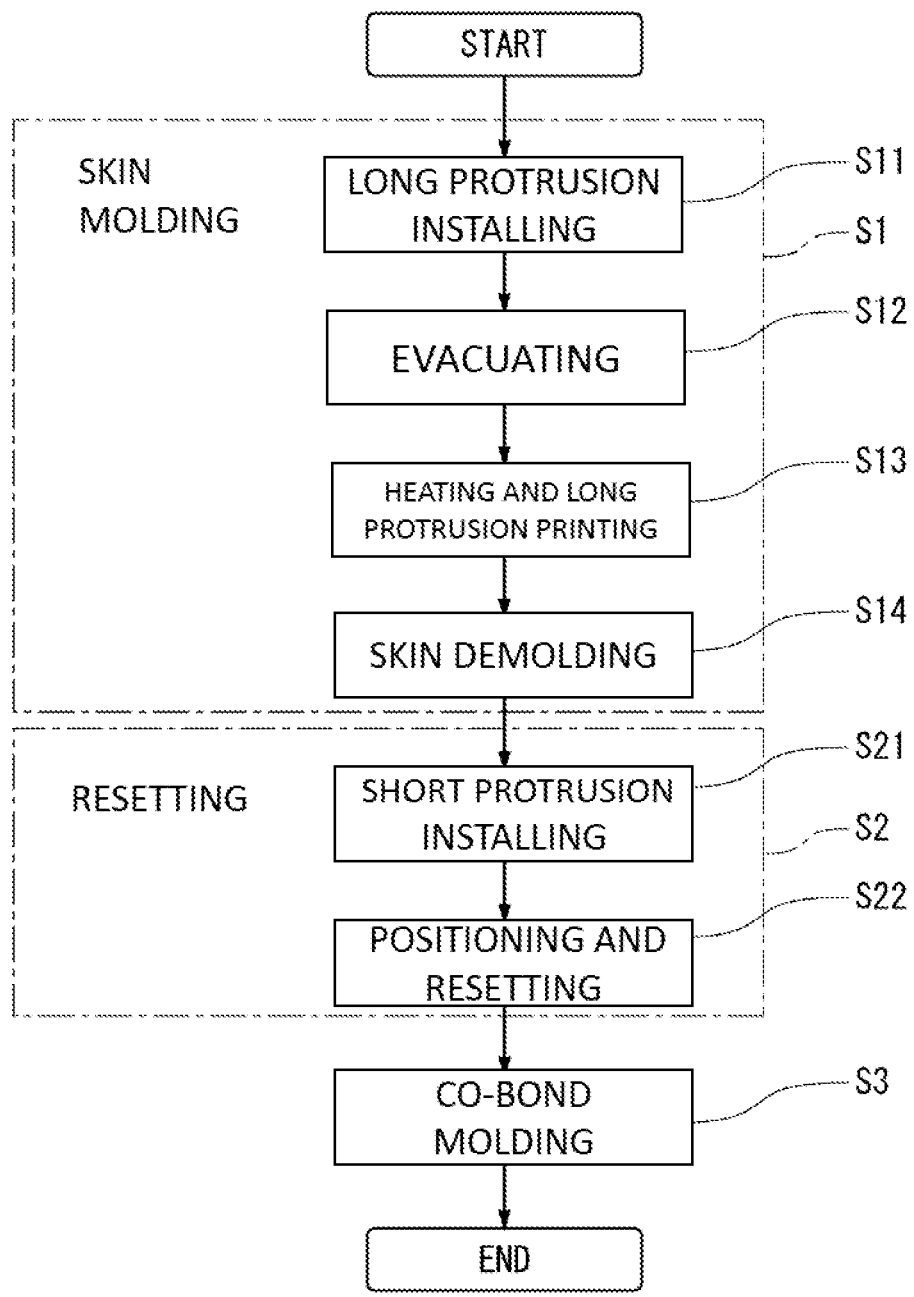

METHOD AND MOLD FOR MANUFACTURING FIBER-REINFORCED PLASTIC STRUCTURE

BACKGROUND OF THE INVENTION

Field of the Invention

The present invention relates to a method for manufacturing a fiber-reinforced plastic structure and a mold used for manufacturing a fiber-reinforced plastic structure.

Description of the Related Art

Being lightweight and excellent in mechanical strength, fiber-reinforced plastics (FRPs) are used for structural members of an aircraft and the like.

For example, a skin of an aircraft and a stringer reinforcing the skin are also formed of FRPs.

Here, as shown in Mitsubishi Heavy Industries Technical Review, Vol. 42, No. 5 (December 2005), "Research in the Application of the VaRTM Technique to the Fabrication of Primary Aircraft Composite Structures," co-bond molding is performed in which a fiber base material as the FRP material of the stringer is disposed in a pre-molded skin, and a resin which is impregnated in the fiber base material is heated and cured. When the resin has cured to a predetermined hardness, the stringer is molded, and at the same time, the stringer is integrally bonded to the skin through an adhesive. Thus, a fiber-reinforced plastic structure is manufactured.

In the co-bond molding of the skin and the stringer, first, the skin is molded by using a mold. The molded skin is then removed from the mold and inspected with ultrasound. Thereafter, the skin is returned (reset) to the mold before the stringer is molded. Then, the stringer is molded while the FRP material of the stringer disposed on the skin is being pressed by a mandrel which is positioned relative to the mold.

In the above-described co-bond molding of the skin and the stringer, unless the skin is returned to the mold at the same position as where the skin was molded, the stringer ends up being molded at a position off a defined position. This makes it difficult to fit the stringer to its mating part.

In order that the skin can be reliably disposed at its original position in the mold, protrusions are formed at positions in the mold corresponding to two points in the skin which are apart from each other, and recessed parts are formed in the skin by printing the protrusions of the mold on the skin during molding of the skin. When returning the skin to the mold, fitting the protrusions of the mold respectively into the recessed parts of the skin allows the skin to be positioned relative to the mold.

However, accurate positioning by the printing approach as described above requires the mold to be made of Invar with a low thermal expansion coefficient, which drives up the material cost of the mold.

If the mold is made of a material with a high thermal expansion coefficient, the protrusions of the mold are printed on the skin while the mold is elongated due to the heat applied during molding, so that, once a normal temperature is reached, the pitch of the protrusions of the mold has become smaller than the pitch of the recessed parts of the skin. As a result, the skin cannot be reset in the state of being positioned relative to the mold.

The object of the present invention based on the above problem is to provide a method and mold for manufacturing a fiber-reinforced plastic structure which allow a demolded fiber-reinforced plastic member to be reset in the state of being positioned relative to the mold, while keeping the material cost of the mold low.

SUMMARY OF THE INVENTION

A method for manufacturing a fiber-reinforced plastic structure of the present invention is a method, including: as preparation for positioning a first fiber-reinforced plastic member relative to a mold at places apart from each other in a predetermined direction, providing the mold with a first printing part at a reference one of the places, and detachably providing the mold with a second printing part, for which a near printing part and a far printing part at different distances from the first printing part in the predetermined direction are interchangeably arranged; a molding step of molding the first fiber-reinforced plastic member by using the mold; a resetting step of returning the first fiber-reinforced plastic member, which has been removed from the mold, to the mold; and an integrating step of integrating a second fiber-reinforced plastic member into the first fiber-reinforced plastic member.

The molding step includes: a near printing part installing step of providing the mold with the near printing part; and a heating and printing step of heating the material of the first fiber-reinforced plastic member, and printing the first printing part on the material to form a first printed part while printing the near printing part on the material to form a second printed part.

The resetting step includes: a far printing part installing step of providing the mold with the far printing part; and a positioning and resetting step of setting the fiber-reinforced plastic member in a state of being positioned relative to the mold, by using the first printing part, which is housed in the first printed part, and the far printing part, which is located in a region of the near printing part after its elongation during the heating and printing step with reference to the first printing part and housed in the second printed part.

Then, a fiber-reinforced plastic structure integrated with the first fiber-reinforced plastic member and the second fiber-reinforced plastic member is obtained by the integrating step.

Here, a protrusion, a recessed part, a step, or the like can be adopted as the form of the first printing part and the second printing part. The first printing part and the second printing part may have the same form or different forms. The forms of the first printed part and the second printed part are determined according to the forms of the first printing part and the second printing part. For example, if the first printing part and the second printing part are protrusions, then the first printed part and the second printed part are recessed parts. Or, if the first printing part and the second printing part are recessed parts, then the first printed part and the second printed part are protrusions.

According to the present invention, in the molding of the fiber-reinforced plastic structure which requires resetting of the first fiber-reinforced plastic member to the mold, as preparation for providing the mold with the positioning protrusions to be printed on the FRP material of the first fiber-reinforced plastic member, the near printing part and the far printing part at different distances from the first printing part are interchangeable as the second printing part, which is apart from the first printing part disposed at a reference place.

Then, the first printing part and the near printing part are printed on the first fiber-reinforced plastic member to form the first printed part and the second printed part in the first fiber-reinforced plastic member, and before the first fiber-reinforced plastic member is reset, the near printing part is replaced with the far printing part.

At this time, as the mold is in a normal temperature range, the pitch between the place where the first printing part is provided and the place where the second printing part is provided has decreased from the pitch at the time of molding of the first fiber-reinforced plastic member. Accordingly, the pitch between the place where the first printing part is provided and the place where the second printing part is provided is narrow compared to the pitch between the first printed part and the second printed part which is equal to the pitch between the first printing part and the second printing part (near printing part) during molding of the first fiber-reinforced plastic member.

Nevertheless, the far printing part is housed in the second printed part which is printed by the near printing part when the mold is elongated, since the far printing part is located in a region of the near printing part after its elongation during molding of the first fiber-reinforced plastic member with reference to the first printing part.

Thus, the first fiber-reinforced plastic member can be reset in the state of being positioned relative to the mold by the far printing part to be housed in the second printed part and the first printing part to be housed in the first printed part.

According to the present invention, a positional shift occurring between the recessed parts printed on the FRP material and the protrusions of the mold at a normal temperature, which is attributable to elongation of the mold due to thermal expansion, can be dealt with by the alternate use of the near printing part and the far printing part. Therefore, an inexpensive material even with a higher thermal expansion coefficient than that of the FRP can be used for the mold, so that the molding cost can be reduced.

According to the present invention, a high positioning accuracy required for resetting the fiber-reinforced plastic member can be achieved by simply providing the mold with the printing parts such as protrusions and recessed parts. Thus, the present invention provides wide-ranging options for the mold material, and materials with a low heat capacity and high thermal conductivity become available regardless of the linear expansion coefficient. This makes it possible to reduce the cycle time for curing the fiber-reinforced plastic member by heating and to save energy.

In the integrating step, which is performed after the first fiber-reinforced plastic member is reset, a second fiber-reinforced plastic member can be molded from the material of the second fiber-reinforced plastic member by an arbitrary method.

In the method for manufacturing a fiber-reinforced plastic structure of the present invention, it is preferable that a long protrusion and a short protrusion with different lengths in the predetermined direction are interchangeably arranged as the second printing part, the long protrusion serving as the near printing part and the short protrusion serving as the far printing part, and that, in the positioning and resetting step, the short protrusion is located within a range of overlap between regions of the long protrusion before and after its elongation during the heating and printing step with reference to the first printing part.

This configuration is effective when the second fiber-reinforced plastic member is molded after the material of the second fiber-reinforced plastic member is heated. In this case, the mold undergoes thermal expansion as the material of the second fiber-reinforced plastic member is heated.

Here, the short protrusion is located not only in the region of the long protrusion after its elongation but also in the region of the long protrusion before its elongation. As the mold is elongated due to thermal expansion, the short protrusion inside the second printed part shifts relative to the first fiber-reinforced plastic member. At this time, since the short protrusion is located in the region of the long protrusion before its elongation, even if the mold is elongated to a dimension equal to its dimension during the molding step, the short protrusion moves only to the end of the second printed part with elongation of the mold, and does not come over the second printed part.

Thus, the short protrusion remains inside the second printed part, and thereby the first fiber-reinforced plastic member is maintained in the state of being positioned relative to the mold, so that the second fiber-reinforced plastic member can be molded at a predetermined position in the first fiber-reinforced plastic member.

In the method for manufacturing a fiber-reinforced plastic structure of the present invention, it is preferable that the near printing part and the far printing part are formed in equal widths and maintained in a direction along the predetermined direction, and the length of the far printing part is longer than its width.

In this way, the far printing part is prevented from rotating relative to the second printed part which is formed in a width corresponding to the width of the near printing part. Thus, the first fiber-reinforced plastic member is positioned along the far printing part in a direction along the predetermined direction, without rotating relative to the mold in the in-plane direction.

Accordingly, even a slight positional shift caused by rotation of the first fiber-reinforced plastic member at the position of the far printing part can be prevented, so that the first fiber-reinforced plastic member can be more accurately positioned relative to the mold.

The method for manufacturing a fiber-reinforced plastic structure of the present invention can be used for molding a fiber-reinforced plastic structure which integrates multiple members used for an aircraft.

In particular, the present invention can be suitably used for the co-bond molding of a skin which is the first fiber-reinforced plastic member and a stringer which is a second fiber-reinforced plastic member.

The present invention can also be developed into a mold which is used for molding a fiber-reinforced plastic structure.

A mold used for molding a fiber-reinforced plastic structure of the present invention is a mold, which allows a first fiber-reinforced plastic member to be positioned at places apart from one another in a predetermined direction, wherein a first printing part is provided at a reference one of the places, and a second printing part, for which a near printing part and a far printing part at different distances from the first printing part in the predetermined direction are interchangeably arranged, is detachably provided.

When the material of the first fiber-reinforced plastic member is heated to mold the first fiber-reinforced plastic member, the first printing part is printed on the material to form a first printed part in the first fiber-reinforced plastic member, while the near printing part is printed on the material to form a second printed part in the first fiber-reinforced plastic member.

After the first fiber-reinforced plastic member is demolded, the far printing part is provided in the mold in place of the near printing part.

When the first fiber-reinforced plastic member is returned to the mold, the first fiber-reinforced plastic member is positioned by the first printing part, which is housed in the first printed part, and the far printing part, which is housed in the second printed part.

Then, a fiber-reinforced plastic structure is obtained by integrating a second fiber-reinforced plastic member into the first fiber-reinforced plastic member.

A method for positioning a fiber-reinforced plastic member of the present invention is a method including: as preparation for positioning a fiber-reinforced plastic member relative to a mold at places apart from one another in a predetermined direction, providing the mold with a first printing part at a reference one of the places, and detachably providing the mold with a second printing part, for which a near printing part and a far printing part at different distances from the first printing part in the predetermined direction are interchangeably arranged; a molding step of molding the fiber-reinforced plastic member by using the mold; and a resetting step of returning the fiber-reinforced plastic member, which has been removed from the mold, to the mold.

In the present invention, the molding step includes: a step of providing the mold with the near printing part, which is closer to the first printing part, as the second printing part; and a heating and printing step of heating the material of the fiber-reinforced plastic member, and printing the first printing part on the material to form a first printed part while printing the near printing part on the material to form a second printed part, and the resetting step includes: a far printing part installing step of providing the mold with the far printing part; and a positioning step of positioning the fiber-reinforced plastic member relative to the mold, by using the first printing part, which is housed in the first printed part, and the far printing part, which is located in a region of the near printing part after its elongation during the heating and printing step with reference to the first printing part and which is housed in the second printed part.

In the method for manufacturing a fiber-reinforced plastic structure and the method for positioning a fiber-reinforced plastic member described above, it is preferable that a protrusion projecting from the mold is used as the second printing part, and that, as preparation for heating the material of the first fiber-reinforced plastic member and printing the first printing part and the second printing part on the material in the molding step, an end portion of a fiber base material, which constitutes the material and is disposed on the near printing part, on a side away from the first printing part is cut off to expose the near printing part from the fiber base material.

In this way, when the mold is elongated during the heating and printing step, the protrusion (near printing part) disposed in the mold comes out of the fiber base material, so that the fiber base material is not pulled by the protrusion. Thus, wrinkling of the fiber base material can be avoided and the molding quality of the first fiber-reinforced plastic member can be improved.

According to the present invention, the demolded fiber-reinforced plastic member can be reset in the state of being positioned relative to the mold even when the mold has a high thermal expansion coefficient, which makes it possible to reduce the molding cost by using an inexpensive material for the mold.

BRIEF DESCRIPTION OF THE DRAWINGS

FIG. 5 is a chart showing a procedure for manufacturing the fiber-reinforced plastic structure;

DETAILED DESCRIPTION OF THE PREFERRED EMBODIMENTS

In the following, an embodiment according to the present invention will be described with reference to the accompanying drawings.

Figure 1:
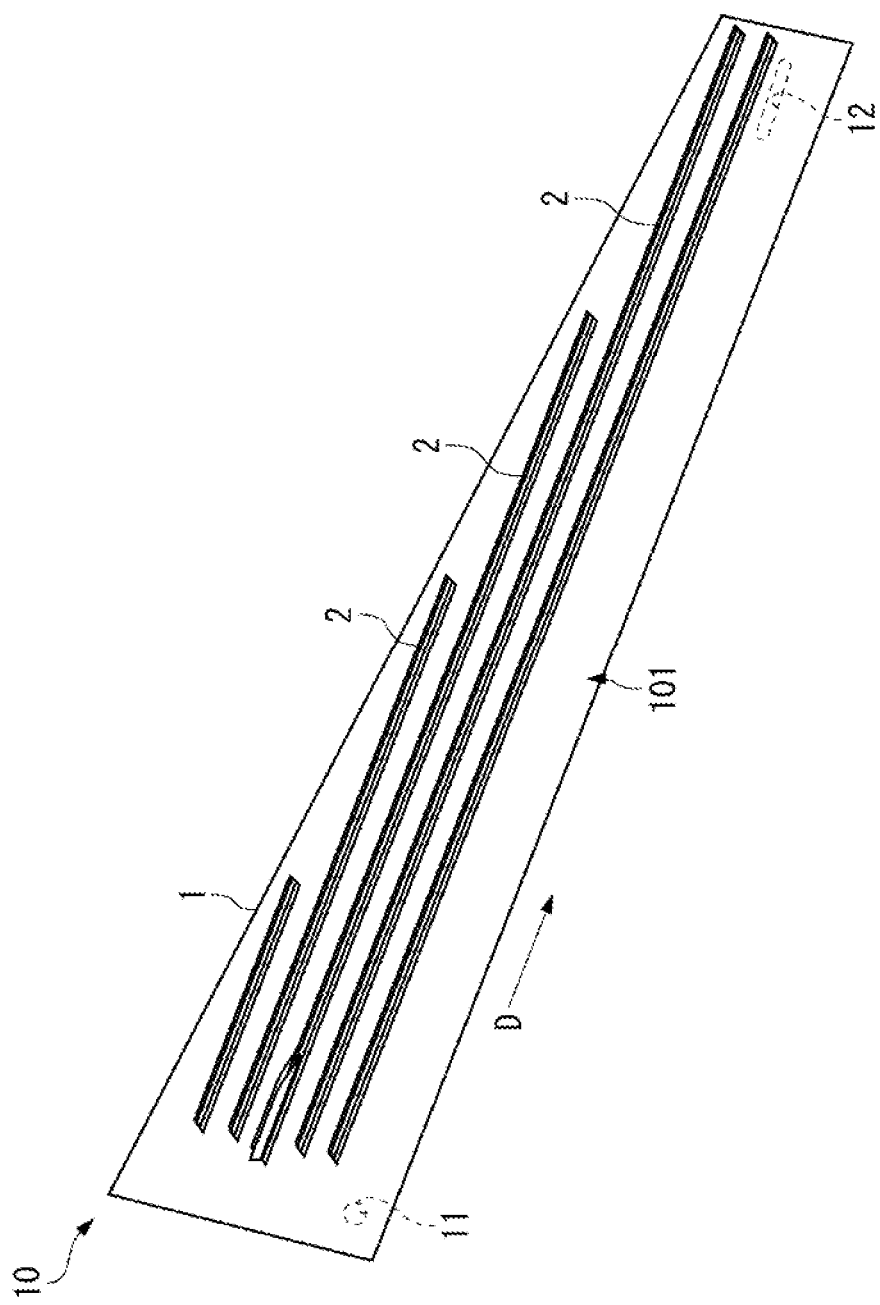
FIG. 1 is a perspective view showing a fiber-reinforced plastic structure according to an embodiment of the present invention.

In this embodiment, a fiber-reinforced plastic structure 10 shown in FIG. 1 will be manufactured.

The fiber-reinforced plastic structure 10 includes a skin 1 and a stringer 2 provided on the back surface of the skin 1.

The skin 1 which forms a surface skin of an aircraft wing is assembled with a spar (not shown) into a box shape. The skin 1 is formed in a curved surface shape. The width of the skin 1 gradually narrows from a root side to a tip side of the wing.

The skin 1 is formed with an extra portion 101 which is eventually cut off.

The multiple stringers 2 reinforce the skin 1 by being provided parallel to one another on the back surface of the skin 1. The stringer 2 is integrally bonded to the back surface of the skin 1. While the stringer 2 has a T-shaped cross-section, the stringer may be formed in another shape.

The fiber-reinforced plastic (FRP) which forms the skin 1 and the stringer 2 is constituted of a fiber base material and a resin.

The fiber base material is formed in a sheet shape, and a required number of the sheets are stacked according to the thickness of the skin 1 or the stringer 2. Any fiber such as carbon fiber or glass fiber can be used as the fiber base material.

A thermosetting resin which cures by being heated, for example, epoxy, vinyl ester, unsaturated polyester, phenol, and bismaleimide, etc, can be used as the resin impregnating the fiber base material. A thermoplastic resin which is solidified by being heated, for example, nylon, polyphenylene sulfide (PPS), polyether ether ketone (PEEK), and polycarbonate can also be used.

In this embodiment, the vacuum assisted resin transfer molding (VaRTM) is performed to mold the fiber-reinforced plastic. That is, an enclosed space is depressurized to a predetermined degree of vacuum by evacuating the air to thereby assist the resin injection, and the fiber base material and the resin are compressed by the differential pressure between the pressure inside the depressurized space and the atmospheric pressure.

Figure 2:
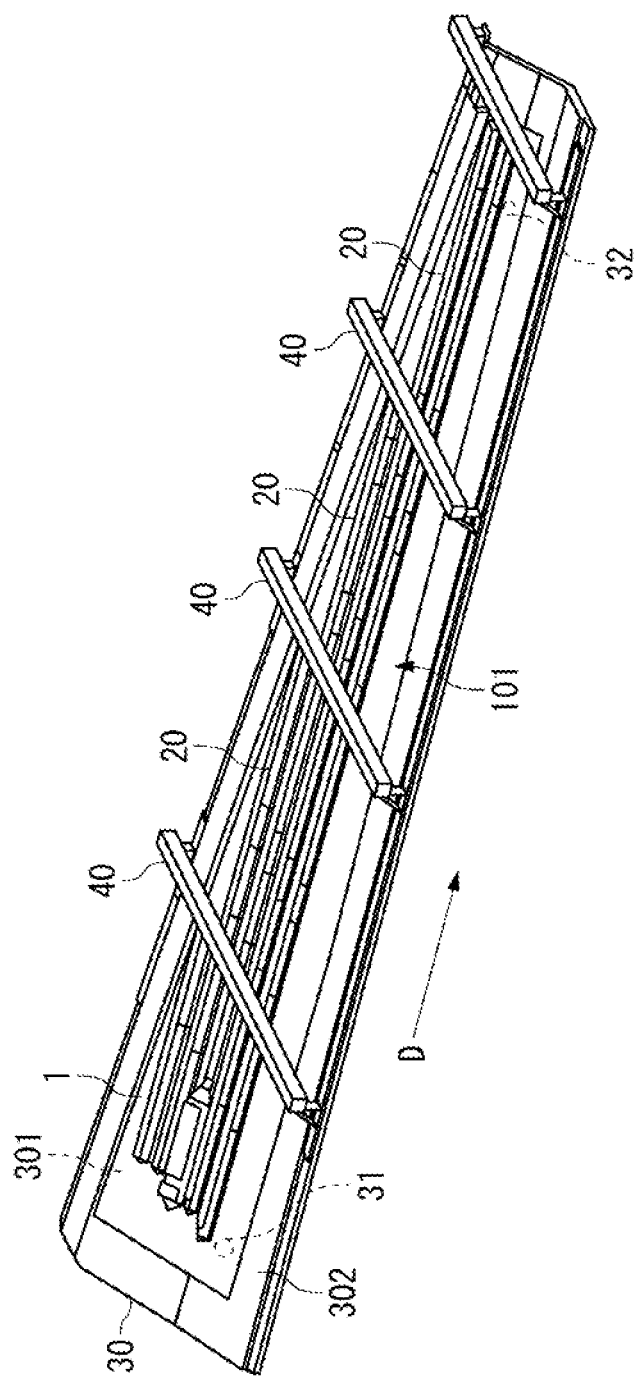
FIG. 2 is a perspective view showing a mold and a jig for manufacturing the fiber-reinforced plastic structure.

Next, the configurations of a mold 30, a mandrel 20, and an alignment jig 40 used for molding the skin 1 and the stringer 2 will be described with reference also to FIG. 2.

The mold 30 molds the skin 1 together with a plate-like molding jig (not shown) which presses the FRP material of the skin 1 against the mold 30.

The mold 30 includes a molding part 301 for molding a surface of the skin 1, and a peripheral part 302 which is a portion surrounding the molding part 301.

The mold 30 of this embodiment is formed of steel. The mold 30 can also be formed of any other metal material such as aluminum, nickel, or titanium.

The mandrel 20 is a mold for molding the stringer 2 by pressing the FRP material against the back surface of the skin 1. The mandrel 20 can be formed of Invar or an FRP. The mandrels 20 with length and shape corresponding to the respective stringers 2 are separately prepared.

The material of the fiber-reinforced plastic is disposed inside the mandrel 20. An injection passage for injecting a liquid resin to the inside is formed in the mandrel 20.

The alignment jig 40 presses the multiple mandrels 20, which are aligned on the back surface of the skin 1, so as not to shift from the predetermined positions. It is preferable that the alignment jig 40 is formed of Invar. The alignment jig 40 spans the mold 30 in the width direction and engages with each mandrel 20.

The multiple alignment jigs 40 are provided at intervals in the length direction of the skin 1.

In this embodiment, the fiber-reinforced plastic structure 10 is manufactured by the co-bond molding of the skin 1 and the stringer 2.

In the co-bond molding, the skin 1 is pre-molded by using the mold 30. The skin 1 is temporarily removed from the mold 30 for inspection, and then is returned (reset) to the mold 30 when the stringer 2 is molded. At this time, a first protrusion 31 and a second protrusion 32 provided in the mold 30 are printed on the skin 1 during molding of the skin 1 so that the skin 1 can be reliably disposed at its original position in the mold 30. Then, the skin 1 is positioned relative to the mold 30 at two places by the recessed parts printed on the skin 1 and the protrusions 31 and 32 of the mold 30.

In the following, the configuration of the first protrusion 31 and the second protrusion 32 provided in the mold 30 will be described.

The first protrusion 31 and the second protrusion 32 are apart from each other in a wing length direction D (predetermined direction). The first protrusion 31 is located on the wing root side. The second protrusion 32 is located on the wing tip side.

The wing root side requires a higher positional accuracy than the wing tip side, for fitting the stringer 2, which is integrated into the skin 1, to its mating part (e.g., auxiliary spar). For this reason, the first protrusion 31 is provided as a positioning reference on the wing root side, while the second protrusion 32 is provided on the wing tip side.

Whether the first protrusion 31 or the second protrusion 32 is provided on the wing root side or the tip side is determined on the basis of factors such as presence of a mating part, a degree of impact of a positional error of the stringer 2 on the strength of the wing.

The first protrusion 31 and the second protrusion 32 are both provided at a position in the molding part 301 corresponding to the extra portion 101 of the skin 1 so as to project from the surface of the mold 30.

The first protrusion 31 is integrally formed in the mold 30. A first recessed part 11 is formed in the extra portion 101 of the skin 1 by the first protrusion 31 being printed on the skin 1.

Figure 3A:
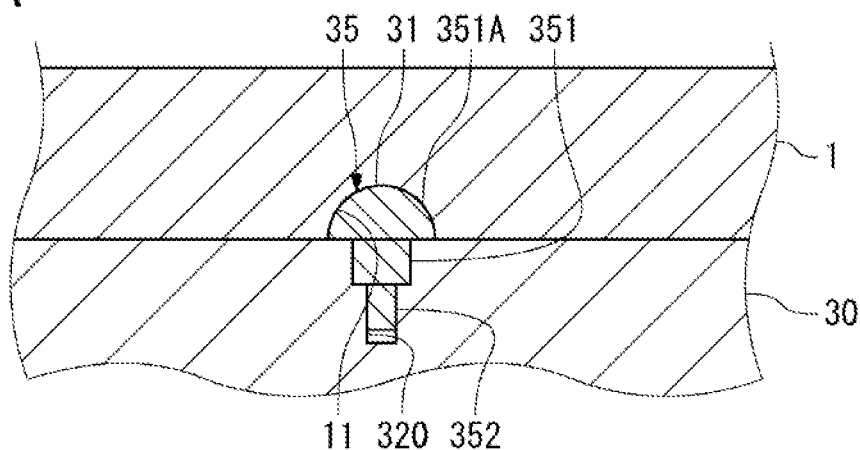
FIG. 3A to FIG. 3C are views showing positioning protrusions provided in the mold, and recessed parts formed in a skin by the protrusions being printed on the skin.

As shown in FIG. 3A in cross-section, the first protrusion 31 is formed in a semispherical shape.

This embodiment features the configuration of the second protrusion 32 in the mold 30.

The second protrusion 32 is detachably provided in the mold 30.

Two types of protrusions, a long protrusion 32A (FIG. 3B) and a short protrusion 32B (FIG. 3C), are interchangeably arranged as the second protrusion 32.

A length L1 of the long protrusion 32A in the wing length direction D is longer than a length L2 of the short protrusion 32B.

The long protrusion 32A is provided in the mold 30 during molding of the skin 1 and used for printing on the skin 1. A second recessed part 12 having a long hole shape is formed in the extra portion 101 of the skin 1 by the long protrusion 32A being printed on the skin 1. Thereafter, the short protrusion 32B is provided in the mold 30 in place of the long protrusion 32A.

The long protrusion 32A and the short protrusion 32B are formed in an equal width W (FIGS. 4A and 4D), and have an elongated circular shape in planar view with the lengths L1 and L2 longer than the width W.

A spherical head pin 35 with the tip of its head portion 351 formed in a semispherical shape is used as the first protrusion 31.

The long protrusion 32A has a structure such that a block 36 can be put over the head portions 351 and 351 of the two spherical head pins 35 and 35 mounted on the mold 30.

The short protrusion 32B likewise has a structure such that a block 37 can be put over the head portions 351 and 351 of the two spherical head pins 35 and 35 mounted on the mold 30.

The spherical head pin 35 includes the head portion 351 and a shaft portion 352 which is formed integrally with the head portion 351. The spherical head pin 35 is fixed to the mold 30 by its shaft portion 352 being fitted with clearance into a hole 320 which is formed in the mold 30. The head portion 351 has a semispherical tip 351A, and the tip 351A projects from the surface of the mold 30.

In this embodiment, since the spherical head pin 35 is provided in the hole 320 of the mold 30, the resin used for molding the skin 1 is prevented from flowing into the hole 320. Thus, the resin is easily wiped off the mold 30.

The blocks 36 and 37 are both disposed on the surface of the mold 30 and include housing portions 360, which have a semispherical shape conforming to the shape of the tip 351A of the head portion 351, at positions corresponding to the two spherical head pins 35 and 35. The blocks 36 and 37 are fixed to the mold 30 by being put over the spherical head pins 35 so that the tip 351A is inserted into the housing portion 360. The clearance between the housing portion 360 and the tip 351A is set to a narrow dimension to prevent inflow of the resin.

The length L1 of the block 36 of the long protrusion 32A is longer than the length L2 of the block 37 of the short protrusion 32B.

The blocks 36 and 37 have a semicircular transverse cross-section perpendicular to the direction of the lengths L1 and L2. In addition, the blocks 36 and 37 have a chamfered curved surface at both ends in the length direction.

Thus, the tip 351A of the head portion 351 of the first protrusion 31, the block 36 of the long protrusion 32A, and the block 37 of the short protrusion 32B are all rounded in every direction on their outer periphery. For this reason, as will be described later, when the first protrusion 31 is housed in the first recessed part 11 and the short protrusion 32B is housed in the second recessed part 12 printed by the long protrusion 32A, these protrusions are smoothly housed in the recessed parts without catching on the mold 30.

Also in the relation between the blocks 36 and 37 and the spherical head pin 35, the semispherical shapes of the housing portions 360 of the blocks 36 and 37 and the tip 351A of the spherical head pin 35 allow the long protrusion 32A and the short protrusion 32B to be smoothly put over the spherical head pin 35 without catching on the spherical head pin 35.

The two spherical head pins 35 supporting the blocks 36 and 37 are held inside the holes 320 and 320 which are formed in the mold 30 at a predetermined interval in the wing length direction D.

The holes 320 and 320 are located nearly at the center in the length direction of the second recessed part 12 formed by the long protrusion 32A. However, it is not necessary that the holes 320 and 320 are located at the center, and the holes may be located closer to the wing tip than at the center.

The long protrusion 32A and the short protrusion 32B are both held on the mold 30 at two points by the two spherical head pins 35. Thus, the long protrusion 32A and the short protrusion 32B are both held in the direction along the wing length direction D while their rotation around the axis of the spherical head pin 35 is restricted.

As will be described later, at a normal temperature, the short protrusion 32B is located within a range of overlap between regions of the long protrusion 32A before and after its elongation during molding of the skin 1 with reference to the first protrusion 31.

The respective lengths L1 and L2 and the relative positions in the wing length direction D of the long protrusion 32A and the short protrusion 32B are set on the basis of calculations and tests according to the thermal expansion coefficient of the mold 30 and the heating temperature of the resin.

Next, a method for manufacturing the fiber-reinforced plastic structure 10 will be described with reference to FIGS. 4A to 4D and FIG. 5.

Figure 4A:
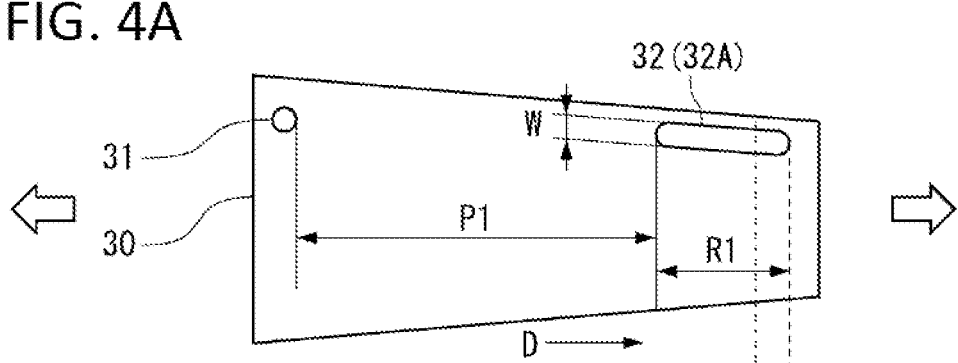
FIG. 4A to FIG. 4D are schematic views for illustrating printing of the protrusions performed during molding of the skin, and positioning of the skin by using a replaced protrusion.

First, the skin 1 is molded (skin molding step S1). At this time, as shown in FIG. 4A, the long protrusion 32A is provided in the mold 30 as the second protrusion (long protrusion installing step S1).

Then, a fiber base material which is the FRP material used for the skin 1 is disposed on the mold 30 and pressed by a plate-like molding jig (not shown).

Figure 3B:
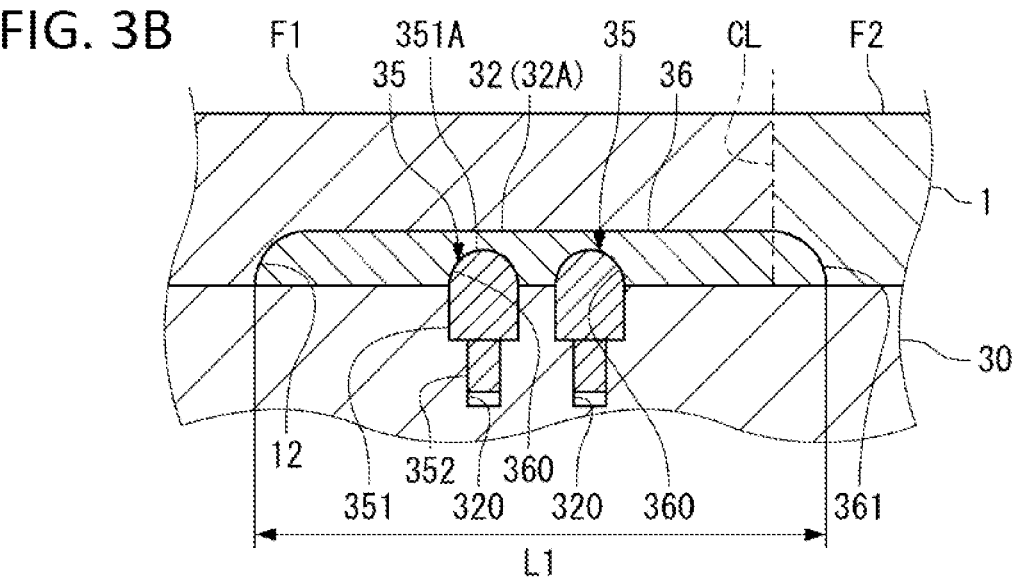
Figure 3C:
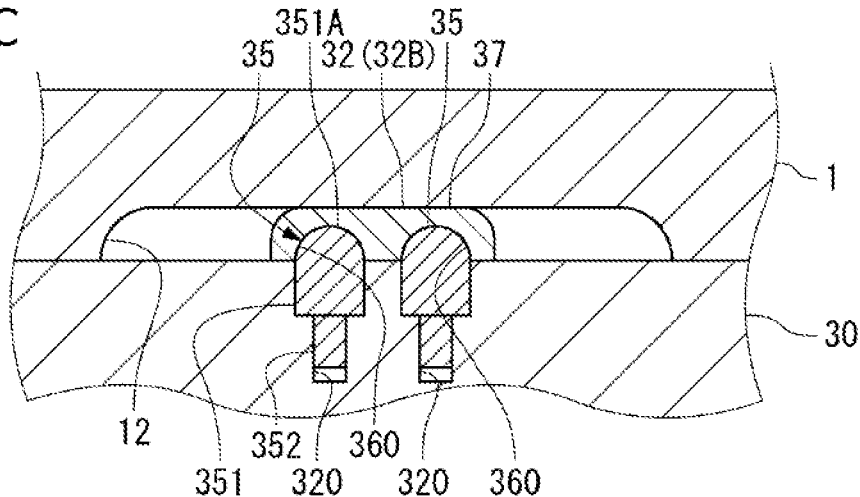

Here, as shown in FIG. 3B, it is preferable that an end portion on the wing tip side of the fiber base material, which is disposed on the long protrusion 32A, is cut off in advance along a line CL indicated by the two-dot chain line. It is only necessary to dispose a fiber base material main body F1, which has been separated from a fiber base material wing end portion F2, on the mold 30. As will be described later, the long protrusion 32A is exposed from the fiber base material by cutting off the end portion of the fiber base material along the line CL on the side away from the first protrusion 31 so that the fiber base material main body F1 is not pulled by the long protrusion 32A when the mold 30 is elongated. The line CL is set closer to the wing root side than an end portion 361 on the wing end side of the block 36 of the long protrusion 32A.

Next, a bag film is put over the molding jig, and the fiber base material and the molding jig are sealed between the bag film and the mold 30. Then, the enclosed space created between the bag film and the mold 30 is depressurized by evacuation of the air. Thus, the resin injection is assisted and the fiber base material and the resin are compressed (evacuating step S12).

Concurrently with evacuation of the air, the resin is heated by using a given heat source. The mold 30 is also heated by the heat produced from the heat source. An oven, a heater mat, a heat gun, etc. can be used as the heat source.

When heated, the mold 30 is elongated due to thermal expansion. In FIG. 4A, the outlined arrow indicates the elongation of the mold 30 in the wing length direction D. In FIGS. 4A to 4D, the molds 30 are aligned with reference to the position of the first protrusion 31. This is the same in FIGS. 6A to 6D as well as in FIGS. 9A to 9D.

Figure 4B:
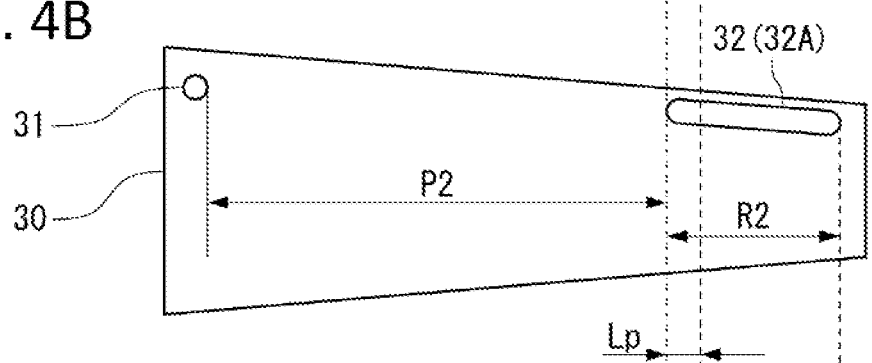

When the mold 30 shown in FIG. 4A is elongated, a pitch P1 between the first protrusion 31 and the long protrusion 32A of the mold 30 is widened to a pitch P2 as shown in FIG. 4B.

Here, as the FRP material of the skin 1 is pressed against the surface of the mold 30 by the molding jig and the differential pressure between the pressure inside the enclosed space and the atmospheric pressure, the first protrusion 31 and the long protrusion 32A are printed on the FRP material (heating and long protrusion printing step S13).

When the resin has cured to a predetermined hardness and the fiber base material and the resin are integrated, the skin 1 is molded. Since the printed shapes are remaining on the skin 1, the first recessed part 11 conforming to the first protrusion 31 and the second recessed part 12 conforming to the long protrusion 32A are formed.

The molded skin 1 is demolded for inspection with ultrasound, for example (skin demolding step S14).

Thus, the skin 1 is molded.

When the mold 30 is elongated during the above-described heating and long protrusion printing step S13, the wing end side of the long protrusion 32A provided in the mold 30 comes out of the fiber base material main body F1. That is, the fiber base material main body F1 is not pulled by the long protrusion 32A while the long protrusion 32A is moving to the right which is the wing end side in FIG. 3B. Thus, wrinkling of the fiber base material can be avoided and the molding quality of the skin 1 can be improved.

Thereafter, the skin 1 is reset on the mold 30 (resetting step S2) before the stringer 2 is molded on the skin 1 which is determined as a non-defective product by the inspection.

Since the mold 30 at this time is in a normal temperature range, it has returned to a dimension equal to its dimension before molding of the skin 1 (FIG. 4A). At this time, the pitch P1 between the first protrusion 31 and the long protrusion 32A is narrower than the pitch between the first recessed part 11 and the second recessed part 12 on the skin 1 which is equal to the pitch P2 after elongation of the mold 30. As such, the skin 1 cannot be reset in the state of being positioned relative to the mold 30.

Figure 4C:
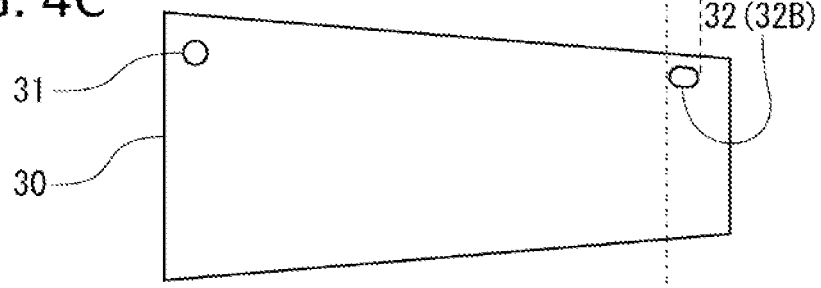

Therefore, as shown in FIG. 4C, in the resetting step S2, the short protrusion 32B is provided in the mold 30 in place of the long protrusion 32A (short protrusion installing step S21).

At this time, the short protrusion 32B is located within a range Lp of overlap between a region R1 of the long protrusion 32A before its elongation during molding of the skin 1 and a region R2 of the long protrusion 32A after its elongation with reference to the first protrusion 31.

Therefore, the short protrusion 32B is located in the region R2 of the long protrusion 32A after its elongation as well as in the region R1 of the long protrusion 32A before its elongation with reference to the first protrusion 31. Resetting the skin 1 requires the short protrusion 32B to be located in the region R2 of the long protrusion 32A after its elongation. It is effective in a co-bond molding step S3, in which the material of the stringer 2 is heated and cured, that the short protrusion 32B is located in the region R1 of the long protrusion 32A before its elongation.

Figure 4D:
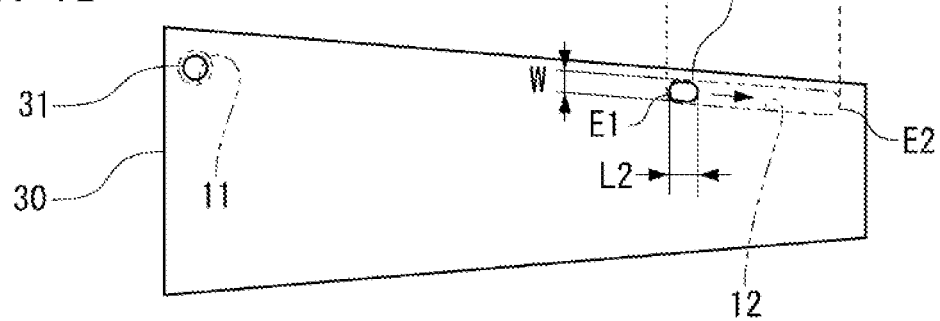
Figure 6A:
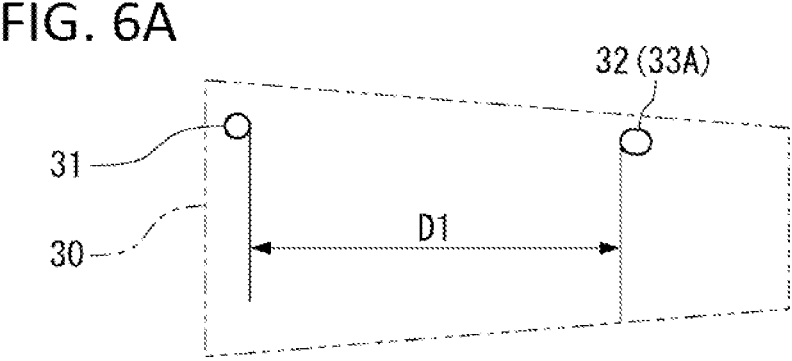
FIG. 6A to FIG. 6D are views showing an example where protrusions of the same length are used as a second protrusion.
Figure 6B:
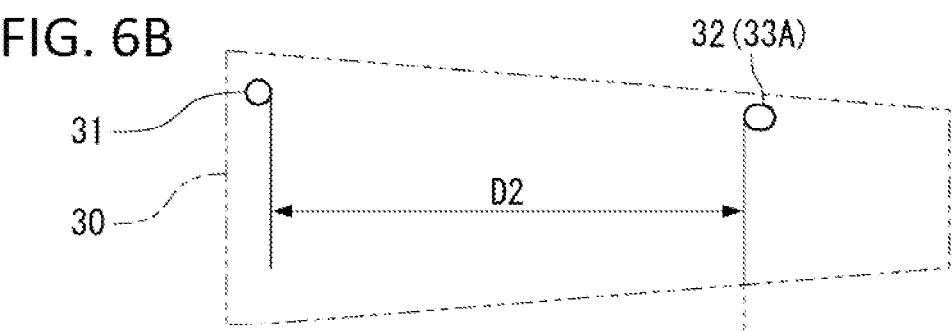
Figure 6C:
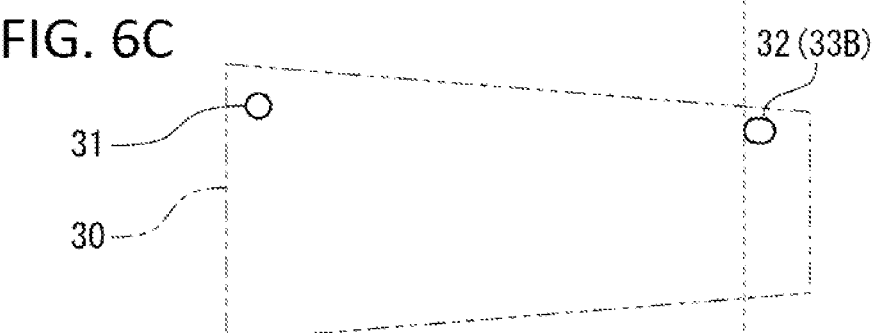
Figure 6D:
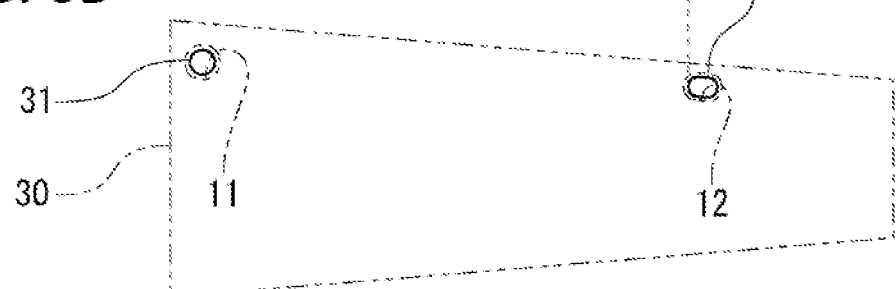

As shown in FIG. 4D, when the skin 1 is set on the mold 30, the first protrusion 31 is housed in the first recessed part 11, while the short protrusion 32B is housed in the second recessed part 12 which reflects the position of the long protrusion 32A during elongation of the mold 30 since the short protrusion 32B is located in the region R2 of the long protrusion 32A after its elongation.

Thus, the skin 1 is held on the mold 30 at the two places of the first protrusion 31 and the short protrusion 32B, and thereby the skin 1 is reset on the mold 30 in the state of being positioned relative to the mold 30 in the planar direction (positioning and resetting step S22).

Here, the second recessed part 12 is formed along the wing length direction D by the long protrusion 32A. The short protrusion 32B housed in this second recessed part 12 is also along the wing length direction D, and the length L2 of the short protrusion 32B is longer than its width W. Therefore, rotation of the short protrusion 32B relative to the second recessed part 12, which is formed in a width corresponding to the width W of the long protrusion 32A, is restricted. This allows the skin 1 to be positioned along the short protrusion 32B in the direction along the wing length direction D, without the skin 1 rotating relative to the mold 30 in the in-plane direction.

Thus, even a slight positional shift due to rotation of the skin 1 at the position of the short protrusion 32B can be prevented, so that the skin 1 can be more accurately positioned relative to the mold 30.

Thereafter, the stringer 2 is molded on the skin 1 by the co-bond molding (co-bond molding step S3). For this purpose, the fiber base material as the FRP material is disposed on the back surface of the skin 1, and the FRP material is pressed by the mandrel 20. A thermosetting adhesive formed in a film shape is interposed between the fiber base material and the skin 1.

Then, the mandrel 20 is sealed between the bag film and the mold 30, before the mandrel 20 is pressed by the alignment jig 40 fixed to the mold 30.

Subsequently, the resin is injected and the fiber base material and the resin are pressurized by the VaRTM method in the same manner as molding of the skin 1. Concurrently, the resin is heated by a given heat source.

The mold 30 undergoes thermal expansion by the heat produced from the heat source during this process. The short protrusion 32B, which is located near an end E1 on the wing root side of the second recessed part 12 at a normal temperature, shifts toward an end E2 on the wing tip side of the second recessed part 12 when the mold 30 is elongated as indicated by the arrow in FIG. 4D.

At this time, as described above, since the short protrusion 32B is also located in the region R1 of the long protrusion 32A before its elongation, even when the mold 30 is elongated to a dimension equal to its dimension during the skin molding step S1, the short protrusion 32B moves only to the end E2 of the second recessed part 12 with elongation of the mold 30. The dimension to which the mold 30 is elongated by the heat applied during molding of the stringer 2 is equal to or less than the dimension to which the mold 30 is elongated due to the heat applied during molding of the skin 1. Therefore, the short protrusion 32B does not come over the end E1 of the second recessed part 12 and remains inside the second recessed part 12. Thus, the skin 1 is maintained in the state of being positioned relative to the mold 30.

Accordingly, when the resin has cured to a predetermined hardness, the stringer 2 is bonded at a predetermined position on the skin 1.

Thereafter, secondary curing treatment and finishing treatment are performed as necessary to complete the manufacture of the fiber-reinforced plastic structure 10 integrated with the skin 1 and the stringer 2.

As has been described above, in this embodiment, as preparation for providing the mold 30 with the positioning protrusions 31 and 32 to be printed on the FRP material of the skin 1 in the co-bond molding which requires resetting of the skin 1 to the mold 30, the long protrusion 32A and the short protrusion 32B are interchangeable as the one protrusion 32.

Then, the long protrusion 32A is printed to form the second recessed part 12 in the skin 1, and before the skin 1 is reset, the long protrusion 32A is replaced with the short protrusion 32B. In this way, even when the pitch (P2) between the first recessed part 11 and the second recessed part 12 is different from the pitch (P1) between the first protrusion 31 and the second protrusion 32, the skin 1 can be reset in the state of being positioned relative to the mold 30 by the first protrusion 31 and the short protrusion 32B.

According to this embodiment, a positional shift occurring between the recessed parts 11 and 12 printed on the FRP material and the protrusions 31 and 32 of the mold 30 at a normal temperature, which is attributable to elongation of the mold 30 due to thermal expansion, can be dealt with by the alternate use of the long protrusion 32A and the short protrusion 32B. Thus, an inexpensive material even with a higher thermal expansion coefficient than the FRP can be used for the mold 30. Since the mold 30 requires a larger amount of material than the mandrel 20 or the alignment jig 40, using an inexpensive material for the mold 30 allows a significant reduction in the molding cost.

In the above embodiment, the stringer 2 is molded on the skin 1 which has been reset on the mold 30, and at the same time, the stringer 2 is bonded to the skin 1; however, the pre-molded stringer 2 may be bonded to the skin 1 which has been reset on the mold 30.

In the above embodiment, the skin is positioned at two places of the one reference place where the first protrusion 31 is provided and the other place where the second protrusion 32 is provided apart from the reference place. However, if the skin 1 is longer, three or more places are sometimes used for positioning the skin. When positioning the skin at three places, the second protrusion 32 is provided at each of the two places other than the reference place. The long protrusion 32A and the short protrusion 32B are interchangeably arranged for one of the second protrusions 32 at the two places, and the long protrusion 32A and the short protrusion 32B are also interchangeably arranged for the other second protrusion 32. Each of the long protrusions 32A and the short protrusions 32B at the two places are set to a length corresponding to the distance from the first protrusion 31.

In view of resetting the skin 1 on the mold 30, it is only necessary that the short protrusion 32B is located in the region R2 of the long protrusion 32A after its elongation with reference to the first protrusion 31. That is, even when the short protrusion 32B is located in the region R2 of the long protrusion 32A after its elongation, closer to the wing tip side than the range Lp of overlap with the region R1, the skin 1 can be set in the state of being positioned relative to the mold 30 as the short protrusion 32B is housed in the second recessed part 12.

Also in view of resetting the skin 1 on the mold 30, as shown in FIGS. 6A to 6D, a near protrusion 33A and a far protrusion 33B of the same length may be arranged as the second protrusion 32.

A distance D1 from the first protrusion 31 to the near protrusion 33A in the wing length direction D is smaller than a distance D2 from the first protrusion 31 to the far protrusion 33B. The distance between the near protrusion 33A and the far protrusion 33B is set so that the far protrusion 33B is located in the region of the near protrusion 33A after its elongation during molding of the skin 1. The distances D1 and D2 correspond to the pitches P1 and P2 described above.

In the configuration shown in FIGS. 6A to 6D, the near protrusion 33A is used for printing on the skin 1, and before resetting the skin 1, the near protrusion 33A is replaced with the far protrusion 33B. Then, due to the positional relation between the near protrusion 33A and the far protrusion 33B, the far protrusion 33B is housed in the second recessed part 12 which is printed by the near protrusion 33A.

Thus, the skin 1 can be reset on the mold 30 in the positioned state by the first protrusion 31 and the far protrusion 33B.

The long protrusion 32A in the above embodiment is equivalent to the near protrusion 33A in that it is closer to the first protrusion 31. The short protrusion 32B is equivalent to the far protrusion 33B in that it is farther from the first protrusion 31.

Figure 7A:
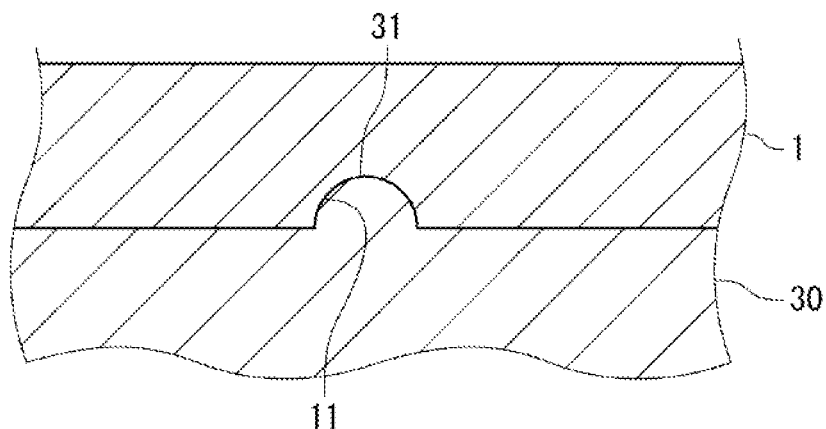
FIG. 7A to FIG. 7C are views showing a modified example of the positioning protrusion provided in the mold.
Figure 7B:
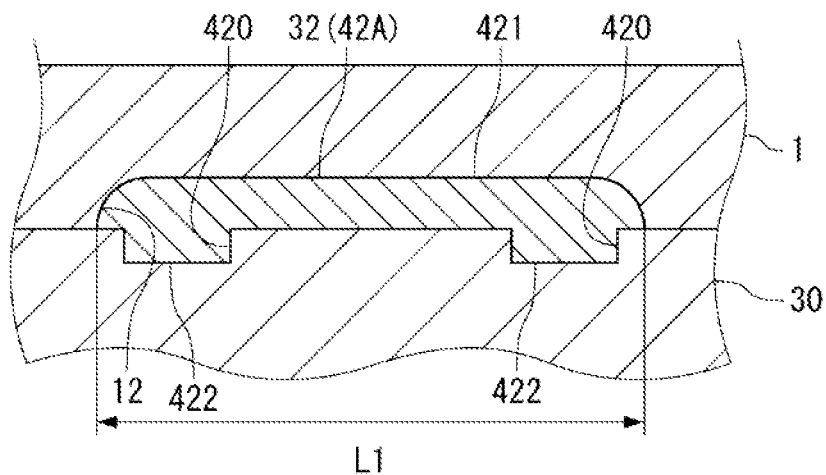
Figure 7C:
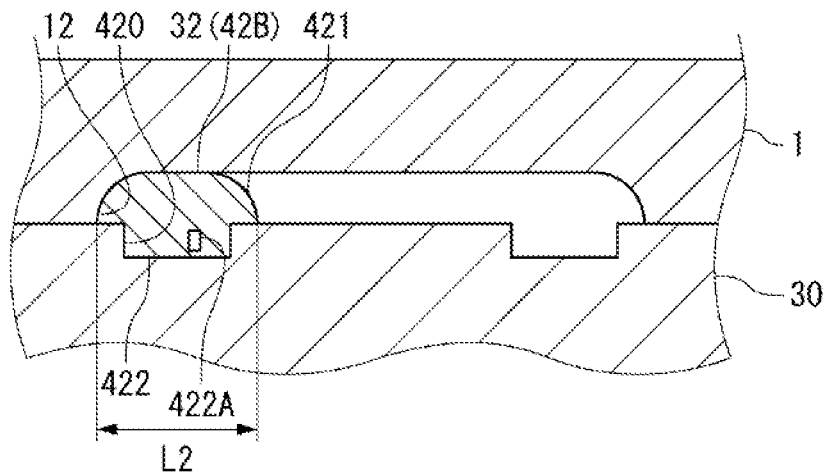

FIGS. 7A to 7C shows forms of the first protrusion 31 and the second protrusion 32 which are different from the above embodiment.

The first protrusion 31 is formed in a semispherical shape integrally with the mold 30.

The second protrusion 32 is detachably provided in the mold 30.

Two types of protrusions, a long protrusion 42A (FIG. 7B) and a short protrusion 42B (FIG. 7C), are interchangeably arranged as the second protrusion 32.

Each of the long protrusion 42A and the short protrusion 42B includes a protrusion body 421 which projects from the surface of the mold 30 and a holding portion 422 which is held on the mold 30.

The long protrusion 42A includes two holding portions 422, while the short protrusion 42B includes one holding portion 422. Each holding portion 422 is formed in a columnar shape with its axis along the direction of projection of the protrusion body 421.

Holes 420 and 420, into which the two holding portions 422 of the long protrusion 42A are inserted, are formed in the mold 30 at positions apart from each other in the wing length direction D. Of the holes 420 and 420, the holding portion 422 of the short protrusion 42B is inserted into the hole 420 on the wing root side.

The long protrusion 42A is held on the mold 30 located at two points by the two holding portions 422. The short protrusion 42B is engaged with a key groove (not shown) on the inner wall of the hole 420 by a key 422A which is formed on the outer periphery of the holding portion 422. Thus, the long protrusion 42A and the short protrusion 42B are both maintained in the direction along the wing length direction D while their rotation around the axis of the holding portion 422 is restricted.

Instead of forming the key 422A and the key groove, the holding portion 422 may be formed in a rectangular columnar shape or an elliptical shape and the hole 420 may be formed in a corresponding shape.

Any number of the holding portions 422 may be provided at any position. The holding portion 422 of the short protrusion 42B may be inserted into a hole which is separately formed from the hole 420 into which the holding portion 422 of the long protrusion 42A is inserted.

Or, the long protrusion 42A may be held on the mold 30 by only one holding portion 422. In this case, rotation around the axis can be restricted, for example, by forming the key 422A in the holding portion 422.

The structure for holding the long protrusion 42A and the short protrusion 42B on the mold 30 is not limited to the above-described holding portion 422, and may be arbitrarily configured.

The first protrusion 31 may also be formed separately from the mold 30 and held on the mold 30, as with the long protrusion 42A and the short protrusion 42B.

The first protrusion 31, the long protrusion 42A, and the short protrusion 42B can be formed in any shape as long as they serve the purpose of positioning.

For example, the protrusion body 421 of the short protrusion 42B may be formed in a semispherical shape as with the first protrusion 31. Also in this case, the skin 1 can be positioned as well in the two-dimensional direction at the two positions of the first protrusion 31 and the short protrusion 42B, so that the skin can be reset as with the above-described embodiment.

It is also possible to form the first protrusion 31 as well as the protrusion body 421 of the short protrusion 42B in a columnar shape.

The long protrusions 32A and 42A and the short protrusions 32B and 42B can be formed of any material such as metal, resin, or ceramics. The long protrusion 32A which is held on the mold 30 by the two spherical head pins 35 and 35 is preferably formed of the same material as the mold 30 or a material with a thermal expansion coefficient near the thermal expansion coefficient of the material of the mold 30 so that the long protrusion 32A does not lift from the mold 30 during thermal expansion. Similarly, the long protrusion 42A held by the two holding portions 422 and 422 is preferably formed of the same material as the mold 30 or a material with a thermal expansion coefficient near the thermal expansion coefficient of the material of the mold 30.

Figure 8A:
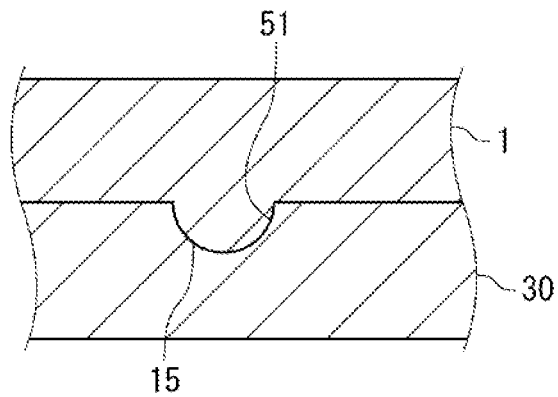
FIG. 8A to FIG. 8C are views showing the positioning recessed parts provided in the mold, and the protrusions formed in the skin by the recessed parts being printed on the skin.
Figure 8B:
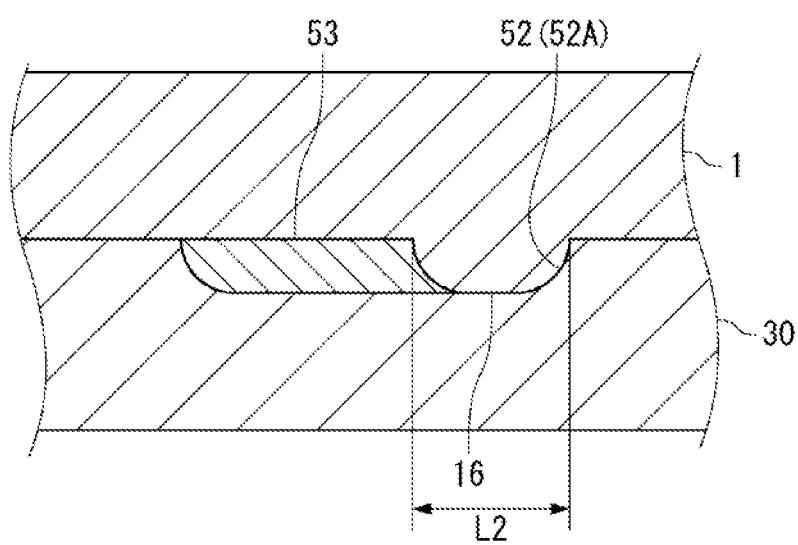
Figure 8C:
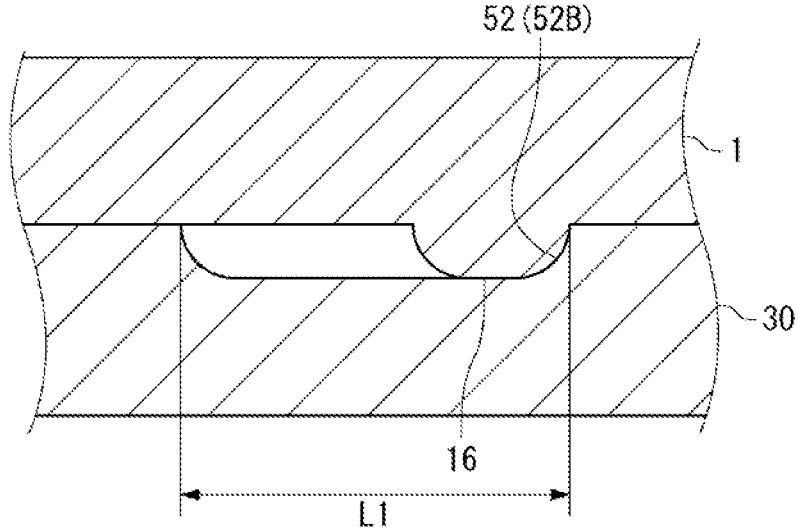

In the above-described embodiment, the skin 1 is positioned relative to the mold 30 by printing the first protrusion 31 and the second protrusion 32, which are provided on the mold 30, on the skin 1; however, as shown in FIGS. 8A to 8C, similar advantages as obtained by providing the first protrusion 31 and the second protrusion 32 can be obtained by printing a first recessed part 51 and a second recessed part 52, which are provided in the mold 30, on the skin 1.

The first recessed part 51 shown in FIG. 8A is provided in place of the above-described first protrusion 31. The first recessed part 51 is formed so as to be dented in a semispherical shape from the surface of the mold 30.

The second recessed part 52 shown in FIG. 8B is provided in place of the above-described second protrusion 32. The second recessed part 52 is configured such that its length in the wing length direction can be changed between the lengths L1 and L2 of a short recessed part 52A (FIG. 8B) and a long recessed part 52B (FIG. 8C), respectively. The length L1 of the long recessed part 52B is longer than the length L2 of the short recessed part 52A. A space which is left inside the long recessed part 52B when a part of the long recessed part 52B, which is dented from the surface of the mold 30, is filled with a member 53 corresponds to the short recessed part 52A.

Figure 9A:
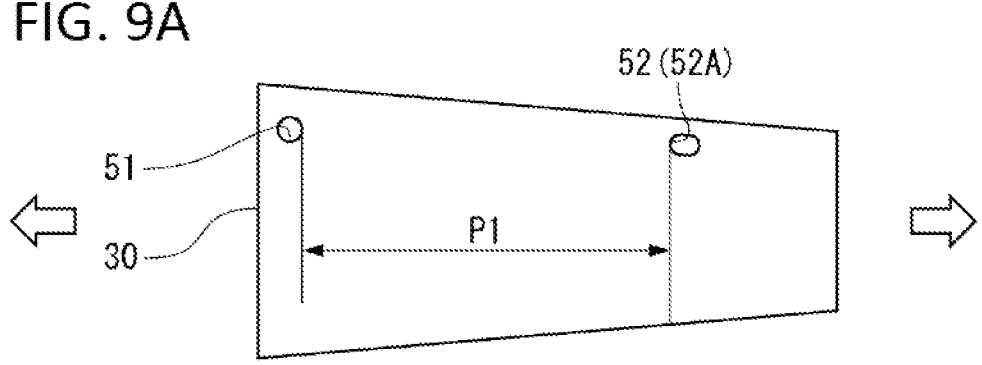
FIG. 9A to FIG. 9D are schematic views for illustrating printing of the recessed parts performed during molding of the skin, and positioning of the skin.

As shown in FIG. 9A, first, the short recessed part 52A is provided as the second recessed part 52 in the mold 30. Next, the material of the skin 1 is disposed on the mold 30, and the material is heated and cured to mold the skin 1. At this time, in the back surface of the skin 1 facing the mold 30, a first protrusion 15 (FIG. 8A) is formed as mainly the resin flows into the first recessed part 51, while a second protrusion 16 (FIG. 8B) is formed as mainly the resin flows into the short recessed part 52A.

Figure 9B:
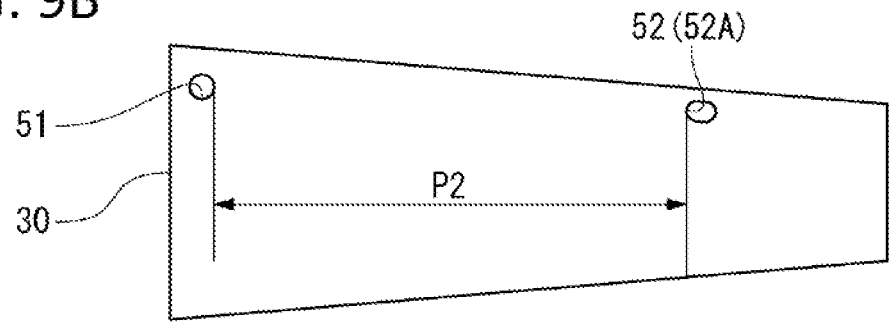

Here, as shown in FIG. 9B, the second protrusion 16 is printed by the short recessed part 52A while the pitch P1 between the first recessed part 51 and the second recessed part 52 has been enlarged to the pitch P2 due to elongation of the mold 30.

Figure 9C:
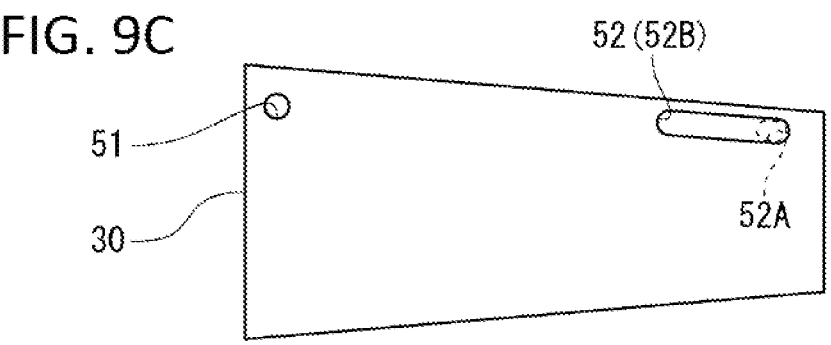

Thereafter, the skin 1 is removed from the mold 30, and by the time the mold 30 is to be reset, the mold 30 has contracted to its original length as shown in FIG. 9C. When the member 53 filling a part of the long recessed part 52B is removed, the space inside the short recessed part 52A (indicated by the broken line) is extended toward the wing root side, and the long recessed part 52B is formed.

Figure 9D:
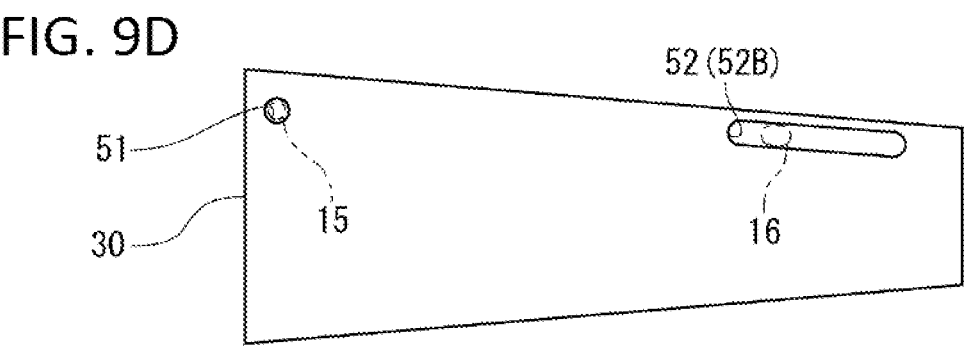

As shown in FIG. 9D, in this state, when the first protrusion 15 (two-dot chain line) of the skin 1 is inserted into the first recessed part 51 and the second protrusion 16 (two-dot chain line) is inserted into the long recessed part 52B, the skin 1 is positioned relative to the mold 30.

Even when the mold 30 is subsequently elongated due to the heat applied during molding of the stringer 2, the skin 1 is maintained in the positioned state as a relative shift of the second protrusion 16 inside the long recessed part 52B is allowed.

It is also possible to provide, as the second recessed part 52, a near recessed part and a far recessed part of the same length at the same positions as the near protrusion 33A and the far protrusion 33B shown in FIGS. 6A to 6D. In this case, the distance from the first recessed part 51 to the near recessed part in the wing length direction D is smaller than the distance from the first recessed part 51 to the far recessed part. The distance between the near recessed part and the far recessed part is set so that the far recessed part is located in a region of the near recessed part after its elongation during molding of the skin 1. Thus, the second protrusion 16 can be inserted into the far recessed part when the skin 1 is reset on the mold 30, so that the skin 1 is positioned at the two places of the first recessed part 51 and the far recessed part.

In the above-described embodiment, the stringer 2 is integrated into the skin 1 which has been reset on the mold 30. However, the present invention is also adaptable to other uses which require resetting of a demolded fiber-reinforced plastic member on a mold, for other purposes than integrating one fiber-reinforced plastic member into the other fiber-reinforced plastic member. For example, the present invention can be applied for trimming the contour of the skin 1 by machining or boring a hole in the skin 1 after it is reset on the mold 30. In addition, the present invention can also be applied for measuring the skin 1 by a three-dimensional measuring machine or a laser measuring machine while the skin 1 is reset on the mold 30.

The present invention also encompasses a molding method in which the skin 1 and the stringer 2 are molded without involving evacuation of the air and only by the weight of the molding jig which presses the material of the skin 1 against the mold 30 or the weight of the mandrel 20 and the alignment jig 40 which press the material of the stringer 2 against the skin 1.

Moreover, the present invention also encompasses the use of a pre-preg in place of the liquid resin and the fiber base material.

The present invention can be suitably used not only for the manufacture of the FRP structure with the skin and the stringer, but also for the manufacture of an FRP structure which includes a plate-like FRP member constituting various devices and structures and another FRP member reinforcing the plate-like FRP member.

In addition, the present invention can be widely used for manufacturing an FRP structure which integrates FRP members, regardless of the shape and the function of the FRP member.

The present invention is not limited to the above examples, but as long as within the scope of the present invention, it is possible to select some of the configurations described in the above embodiment, or to arbitrarily change some of the configurations into another configuration.

What is claimed is:

1. A method for manufacturing a fiber-reinforced plastic structure, comprising:
   providing a mold with a first printing part at a reference location and a second printing part at a second location spaced apart from the reference location in a predetermined direction, wherein the second printing part is a long protrusion extending in the predetermined direction;
   a first molding step wherein a first fiber-reinforced plastic member is molded on the mold with heating such that the first printing part forms a first print on the fiber-reinforced plastic member and the second printing part forms a second print on the fiber-reinforced plastic member;
   removing the first fiber-reinforced plastic member from the mold;
   replacing the second printing part with a short protrusion;
   a resetting step wherein the first fiber-reinforced plastic member is reset on the mold so that the short protrusion is located in the second print formed by the second printing part; and
   a second molding step wherein a second fiber-reinforced plastic member is molded onto the reset first fiber-reinforced plastic member with heating.

2. The method for manufacturing the fiber-reinforced plastic structure according to claim 1, wherein
   the long protrusion and the short protrusion have different lengths in the predetermined direction,
   in the first molding step, the mold is heated such that long projection moves from a first region to a second region along the predetermined direction, and
   in the resetting step, the short protrusion is located within a range of overlap between the first region and the second region.

3. The method for manufacturing the fiber-reinforced plastic structure according to claim 1, wherein
   the long protrusion and the short protrusion are formed in equal widths and maintained in a direction along the predetermined direction, and
   a length of the long protrusion is longer than a width of the long protrusion.

4. The method for manufacturing the fiber-reinforced plastic structure according to claim 1, wherein
   as preparation the first molding step, an end portion of a fiber base material, which constitutes a material of the first fiber-reinforced plastic member and is disposed on the second printing part, is cut off on a side away from the first printing part to expose the second printing part from the fiber base material.

5. The method for manufacturing the fiber-reinforced plastic structure according to claim 1, wherein
the first fiber-reinforced plastic member is a skin of an aircraft, and
the second fiber-reinforced plastic member is a stringer of the aircraft.

6. The method for manufacturing the fiber-reinforced plastic structure according to claim 1, wherein the first fiber-reinforced plastic member and the second fiber-reinforced plastic member are constituent members of an aircraft.

7. A method for manufacturing a fiber-reinforced plastic structure, comprising:
providing a mold with a first printing part at a reference location and a second printing part at a second location spaced apart from the reference location in a predetermined direction;
a first molding step wherein a first fiber-reinforced plastic member is molded on the mold with heating such that the first printing part forms a first print on the fiber-reinforced plastic member and the second printing part forms a second print on the fiber-reinforced plastic member;
removing the first fiber-reinforced plastic member from the mold;
removing the second printing part from the mold and providing the mold with a protrusion, wherein the protrusion is provided at a different portion of the mold than the second printing part; and
a resetting step wherein the first fiber-reinforced plastic member is reset on the mold so that the protrusion is located in the second print formed by the second printing part.

8. The method for manufacturing the fiber-reinforced plastic structure according to claim 7, further comprising a second molding step wherein a second fiber-reinforced plastic member is molded onto the reset first fiber-reinforced plastic member with heating.

9. The method for manufacturing the fiber-reinforced plastic structure according to claim 8, wherein
the first fiber-reinforced plastic member is a skin of an aircraft, and
the second fiber-reinforced plastic member is a stringer of the aircraft.

10. The method for manufacturing the fiber-reinforced plastic structure according to claim 8, wherein the first fiber-reinforced plastic member and the second fiber-reinforced plastic member are constituent members of an aircraft.

11. The method for manufacturing the fiber-reinforced plastic structure according to claim 7, wherein
the second printing part and the protrusion have different lengths in the predetermined direction,
in the first molding step, the mold is heated such that the second printing part moves from a first region to a second region along the predetermined direction, and
in the resetting step, the protrusion is located within a range of overlap between the first region and the second region.

12. The method for manufacturing the fiber-reinforced plastic structure according to claim 7, wherein the second printing part and the protrusion are formed in equal widths and maintained in a direction along the predetermined direction, and
a length of the second printing part is longer than a width of the second printing part.

13. The method for manufacturing the fiber-reinforced plastic structure according to claim 7, wherein
as preparation for the first molding step, an end portion of a fiber base material, which constitutes a material of the first fiber-reinforced plastic member and is disposed on the second printing part, is cut off on a side away from the first printing part to expose the second printing part from the fiber base material.

14. A method for manufacturing a fiber-reinforced plastic structure, comprising:
providing a mold with a first printing part at a reference location and a second printing part at a second location spaced apart from the reference location in a predetermined direction;
a first molding step wherein a first fiber-reinforced plastic member is molded on the mold with heating such that the first printing part forms a first print on the fiber-reinforced plastic member and the second printing part forms a second print on the fiber-reinforced plastic member;
removing the first fiber-reinforced plastic member from the mold;
removing the second printing part from the mold and providing the mold with a protrusion, wherein the second printing part and the protrusion have different lengths in the predetermined direction; and
a resetting step wherein the first fiber-reinforced plastic member is reset on the mold so that the protrusion is located in the second print formed by the second printing part.

15. The method for manufacturing the fiber-reinforced plastic structure according to claim 14, further comprising a second molding step wherein a second fiber-reinforced plastic member is molded onto the reset first fiber-reinforced plastic member with heating.

16. The method for manufacturing the fiber-reinforced plastic structure according to claim 15, wherein
the first fiber-reinforced plastic member is a skin of an aircraft, and
the second fiber-reinforced plastic member is a stringer of the aircraft.

17. The method for manufacturing the fiber-reinforced plastic structure according to claim 15, wherein the first fiber-reinforced plastic member and the second fiber-reinforced plastic member are constituent members of an aircraft.

18. The method for manufacturing the fiber-reinforced plastic structure according to claim 14, wherein:
in the first molding step, the mold is heated such that the second printing part moves from a first region to a second region along the predetermined direction, and
in the resetting step, the protrusion is located within a range of overlap between the first region and the second region.

19. The method for manufacturing the fiber-reinforced plastic structure according to claim 14, wherein
the second printing part and the protrusion are formed in equal widths and maintained in a direction along the predetermined direction, and
a length of the second printing part is longer than a width of the second printing part.

20. The method for manufacturing the fiber-reinforced plastic structure according to claim 14, wherein
as preparation for the first molding step, an end portion of a fiber base material, which constitutes a material of the first fiber-reinforced plastic member and is disposed on the second printing part, is cut off on a side away from the first printing part to expose the second printing part from the fiber base material.

\* \* \* \* \*